US008804191B2

(12) United States Patent
Watanabe et al.

(10) Patent No.: US 8,804,191 B2
(45) Date of Patent: Aug. 12, 2014

(54) IMAGE PROCESSING APPARATUS AND IMAGE PROCESSING PROGRAM FOR SELECTING AND DISPLAYING IMAGE DATA

(75) Inventors: Toshinari Watanabe, Nagoya (JP); Takahiro Ikeno, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1442 days.

(21) Appl. No.: 11/740,167

(22) Filed: Apr. 25, 2007

(65) Prior Publication Data

US 2007/0253034 A1 Nov. 1, 2007

(30) Foreign Application Priority Data

Apr. 28, 2006 (JP) ................................. 2006-126472

(51) Int. Cl.
*G06F 15/00* (2006.01)
*G06F 17/00* (2006.01)

(52) U.S. Cl.
USPC ........................................... 358/1.9; 715/273

(58) Field of Classification Search
USPC ............................ 358/1.2, 448, 1.9, 400, 1.13
See application file for complete search history.

(56) References Cited

U.S. PATENT DOCUMENTS

| | | | | |
|---|---|---|---|---|
| 5,341,466 | A | * | 8/1994 | Perlin et al. .................... 345/668 |
| 5,652,901 | A | * | 7/1997 | Slayden et al. ................ 715/209 |
| 5,883,619 | A | * | 3/1999 | Ho et al. ........................ 345/163 |
| 6,285,461 | B1 | * | 9/2001 | Fujii et al. ..................... 358/1.18 |
| 6,385,348 | B1 | | 5/2002 | Harada |
| 7,064,858 | B2 | * | 6/2006 | Iwai et al. ...................... 358/1.2 |
| 2002/0109687 | A1 | * | 8/2002 | Ishii et al. .................. 345/472.2 |
| 2005/0128529 | A1 | | 6/2005 | Yoshino |
| 2005/0286090 | A1 | * | 12/2005 | Ahne et al. .................... 358/452 |
| 2006/0072174 | A1 | * | 4/2006 | Koike et al. ................... 358/537 |

FOREIGN PATENT DOCUMENTS

| | | |
|---|---|---|
| CN | 2005-1627794 A | 6/2005 |
| JP | H04-322558 A | 11/1992 |
| JP | H5-48877 A | 2/1993 |
| JP | H5-63160 U | 8/1993 |
| JP | H9-16796 A | 1/1997 |

(Continued)

OTHER PUBLICATIONS

The State Intellectual Property Office of the People's Republic of China, Notification of First Office Action in Patent Application No. CN 2007100972056 (counterpart to the above-captioned U.S. patent application) issued Feb. 6, 2009.

(Continued)

*Primary Examiner* — Benny Q Tieu
*Assistant Examiner* — Sunil Chacko
(74) *Attorney, Agent, or Firm* — Baker Botts L.L.P.

(57) ABSTRACT

An image processing apparatus includes: a key operation unit including a plurality of keys; a display screen; a first storage unit that stores an image data; and a processor that performs a processing. The processing performed by the processor includes displaying a first image corresponding to the image data on the display screen; setting an upper end and a lower end in the first image displayed on the display screen based on a key input from the key operation unit to designate a range between the upper end and the lower end in the first image; selecting image data corresponding to the designated range in the first image; and displaying a second image corresponding to the selected image data on the display screen.

19 Claims, 8 Drawing Sheets

(56) References Cited

FOREIGN PATENT DOCUMENTS

| JP | H10-161234 A | 6/1998 |
| JP | 2000216959 A | 8/2000 |
| JP | 2002-215281 A | 7/2002 |
| JP | 2003244586 A | 8/2003 |
| JP | 2007-079947 A | 3/2007 |

OTHER PUBLICATIONS

Japan Patent Office, Notification of Reasons for Refusal for Japanese Patent Application No. 2006-126472 (counterpart to above-captioned patent application), dispatched Mar. 15, 2011.

* cited by examiner

IMAGE PROCESSING APPARATUS AND IMAGE PROCESSING PROGRAM FOR SELECTING AND DISPLAYING IMAGE DATA

CROSS-REFERENCE TO RELATED APPLICATION

This application claims priority from Japanese Patent Application No. 2006-126472, filed on Apr. 28, 2006, the entire subject matter of which is incorporated herein by reference.

TECHNICAL FIELD

An aspect of the present invention relates to an image processing apparatus and an image processing program, and more particularly, to an image processing apparatus and image processing program in which users can easily select a part of an image by a simple configuration.

BACKGROUND

An image processing apparatus prints image data on predetermined recording media and an image processing apparatus facsimile-transmits image data via a communication line.

JP-UM-A-5-63160 discloses an image processing apparatus which displays one page of a document received by facsimile in a reduced manner on a display unit. A user can designate an area in the page displayed on the display unit by using a mouse, and the image processing apparatus displays the designated area.

According to the image processing apparatus described in JP-UM-A-5-63160, a mouse is used to designate an area on a reduced-displayed image for display it. However, in an image processing apparatus such as a facsimile machine or a printer which is not equipped with a mouse, it is impossible to designate an area.

SUMMARY

An aspect of the present invention provides an image processing apparatus and image processing program in which users can easily select a part of an image.

An aspect of the present invention provides an image processing apparatus including: a key operation unit comprising a plurality of keys; a display screen having a substantially rectangular shape including an upper side end and a lower side end which are opposite to each other; a first storage unit that stores an image data; and a processor that performs a processing. The processing performed by the processor includes: displaying a first image corresponding to the image data on the display screen; setting an upper end and a lower end in the first image displayed on the display screen based on a key input from the key operation unit to designate a range between the upper end and the lower end in the first image; selecting image data corresponding to the designated range in the first image; and displaying a second image corresponding to the selected image data on the display screen.

An aspect of the present invention provides a computer program product embodied on a computer readable medium, which when executed by a computer, causes the computer to perform operations. The operations include displaying a first image corresponding to an image data stored in a storage unit on a display screen; setting an upper end and a lower end in the first image displayed on the display screen based on a key input from a key operation unit to designate a range between the upper end and the lower end in the first image; selecting image data corresponding to the designated range in the first image on the display screen; and displaying a second image corresponding to the selected image data on the display screen.

An aspect of the present invention provides an image processing apparatus including: a display; a memory; and a processor provided to be accessible to the memory, the processor being operable to perform a process. The process includes: at least partly displaying an image on the display; displaying a laterally extending, first line at a first longitudinal position on the image by a first instruction; moving the first line from the first longitudinal position to a second longitudinal position and displaying the first line at the second longitudinal position on the image if the user inputs an optional, second instruction designating the second longitudinal position; fixing the first line at one of the first and second longitudinal positions, at which the first line is currently displayed, on the image by a third instruction; displaying a laterally extending, second line at a third longitudinal position on the image by the third instruction; moving the second line from the third longitudinal position to a fourth longitudinal position and displaying the second line at the fourth longitudinal position on the image if the user inputs an optional, fourth instruction designating the fourth longitudinal position; and fixing the second line at one of the third and fourth longitudinal positions, at which the second line is currently displayed, on the image by a fifth instruction.

DETAILED DESCRIPTION

First Aspect

Hereinafter, a first aspect of the present invention will be described with reference to the accompanying drawings.

Figure 1:
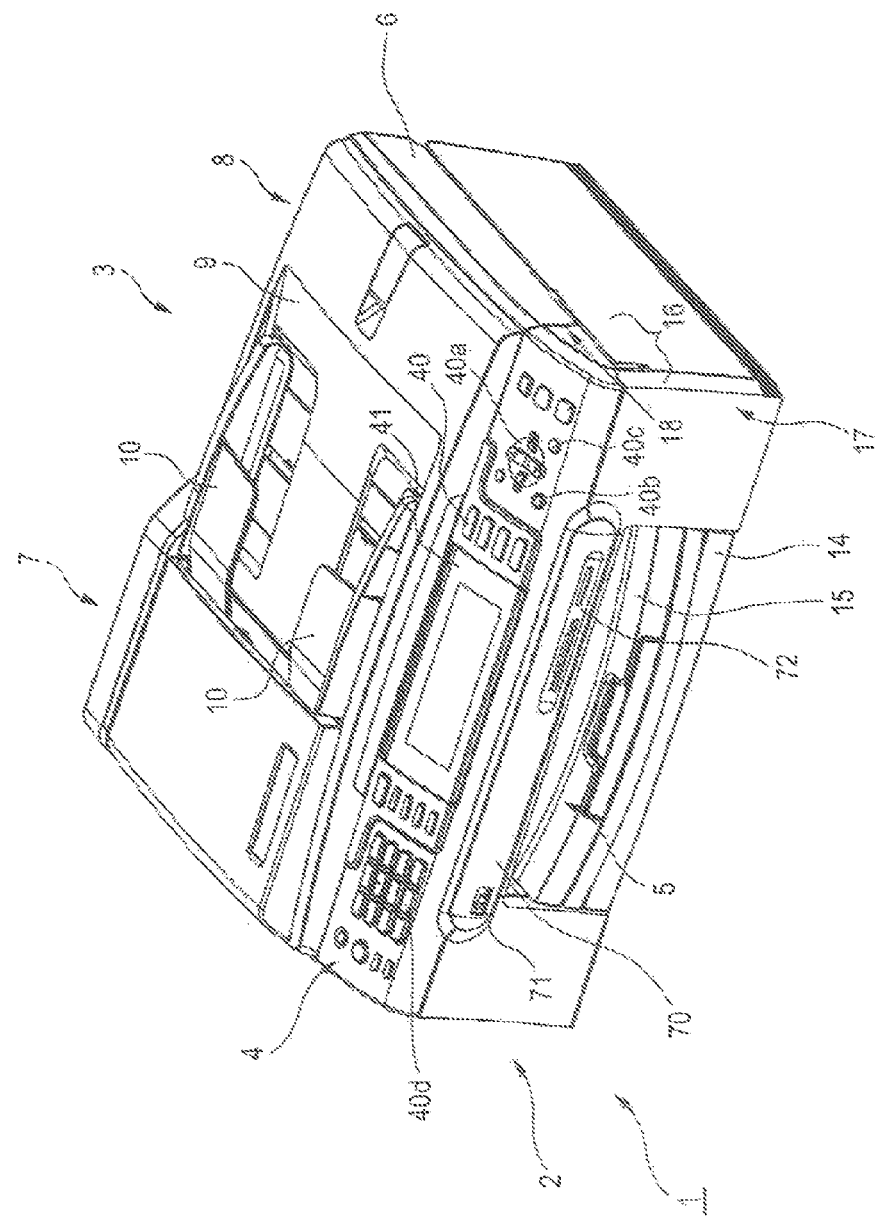
FIG. 1 is a perspective view showing an external appearance of a multifunction peripheral device including the image processing apparatus of a first aspect of the present invention.

FIG. 1 is a perspective view showing an external view of the structure of a Multi Function Peripheral (hereinafter, abbreviated to "MFP") 1 in the first aspect of the present invention. As shown in FIG. 1, this MFP 1 includes a printer 2 provided on a lower portion, a scanner 3 provided on an upper portion, and an operation panel 4 integrated on the front face side of the scanner 3 in an integral manner, and has a printer function, a scanner function, a copying function, and a facsimile function.

The MFP 1 may be connected to a computer (not shown) Based on image data or document data transmitted from the computer, the MFP 1 forms an image or a document on recording sheets (recording media), forms on recording sheets an image outputted from an external device such as a digital camera to which the MFP capable of being connected, and forms on recording sheets image and the like stored in various recording media such as a memory card loaded therein. As a matter of course, this MFP 1 is capable of forming images not only on recording sheets but also on transparent film sheets for OHP and cloth (both of these are other examples of recording media).

The scanner 3 includes a document cover 8 including an auto document feeder (hereinafter, referred to as "ADF"), and is attached to a document scanning base 6 that functions as a Flatbed Scanner (FBS) so as to freely open and close around a hinge provided on the back side as a pivot.

The document scanning base 6 includes a wide opening on the upper surface thereof. In this opening, a platen glass is fitted. Inside the document scanning base 6, a movement space for the image scanning unit and a space for arrangement of an image scanning unit or a member for supporting and a mechanism for driving the image scanning unit, etc., are secured.

The ADF 7 feeds a document through a document feeding path from a document tray 9 to a document sheet ejection tray 10. The printer 2 forms an image on a recording sheet by selectively discharging ink drops based on image data read by the scanner 3 or image data externally inputted. That is, the printer 2 is a so-called ink-jet image forming unit (ink-jet forming unit). This printer 2 is disposed below the scanner 3 as describe above.

On the front side of the MFP 1, that is, on the front side of the printer 2, an opening 5 is formed. Inside this opening 5, a sheet feeding tray 14 and a sheet ejection tray 15 are contained. The sheet feeding tray 14 and the sheet ejection tray 15 are disposed so as to be stacked vertically. On an upper stage, the sheet ejection tray 15 is provided, and the sheet feeding tray 14 may be provided below the sheet ejection tray 15.

On the front side of the MFP 1, an operation panel 4 is provided. The operation pane 14 is formed to be long sideways as shown in FIG. 1 so as to fit in the void space above the projecting portion 16. In other words, the operation panel 4 is formed into a size fitting within a length (longitudinal width of the void space) that is a result of subtracting the longitudinal width of the printer 2 from the longitudinal width of the scanner 3. The operation panel 4 is for operating the printer 2 and the scanner 3, and includes various operation keys 40 and a liquid crystal display (LCD) 41 (display screen). This display screen 41 includes two screens with an aspect ratio of 3:4 arranged side to side so that an aspect ratio thereof is 3:8. In the first aspect, a lateral width of the display screen 41 is longer than a longitudinal width thereof. As a matter of course, the longitudinal width of the display screen 41 may be longer than the lateral width thereof.

A user can input a desired instruction by using the operation panel 4. When a predetermined instruction is inputted in the MFP 1, based on inputted information, the operation of the MFP 1 is controlled by a controller 20. The operation keys provided on the operation panel 4 include a cross key 40a for designating any of left, right, up and down keys, a determination key (enter key) 40b for mainly instructing determination of an operation, a stop key 40c for mainly instructing stop of processing, and a numeric keypad 40d for inputting numerals of 0 to 9 on the left side of the display screen.

The MFP 1 may be connected to a computer and configured so as to operate based on an instruction transmitted from the computer via a printer driver or a scanner driver, etc., in addition to an instruction inputted from the operation panel 4.

Above the opening 5 of the printer 2, a connection panel 70 is provided. On this connection panel 70, a USB terminal 71 is provided on the left end. The USB terminal 71 is a connector terminal which makes USB connection to an external device to enable communication between the external device and this MFP 1. On the right end of the connection panel 70, a slot section 72 is provided. The slot section 72 includes a plurality of card slots into which card type memories can be loaded. When a card type memory is loaded in the card slot and image data is readout by the controller 20 described later from the loaded card type memory, the readout image data and information on the image data are displayed on the display screen 41 by the controller 20. Alternatively, a selected arbitrary image is formed on a recording sheet by the printer 2.

Figure 2:
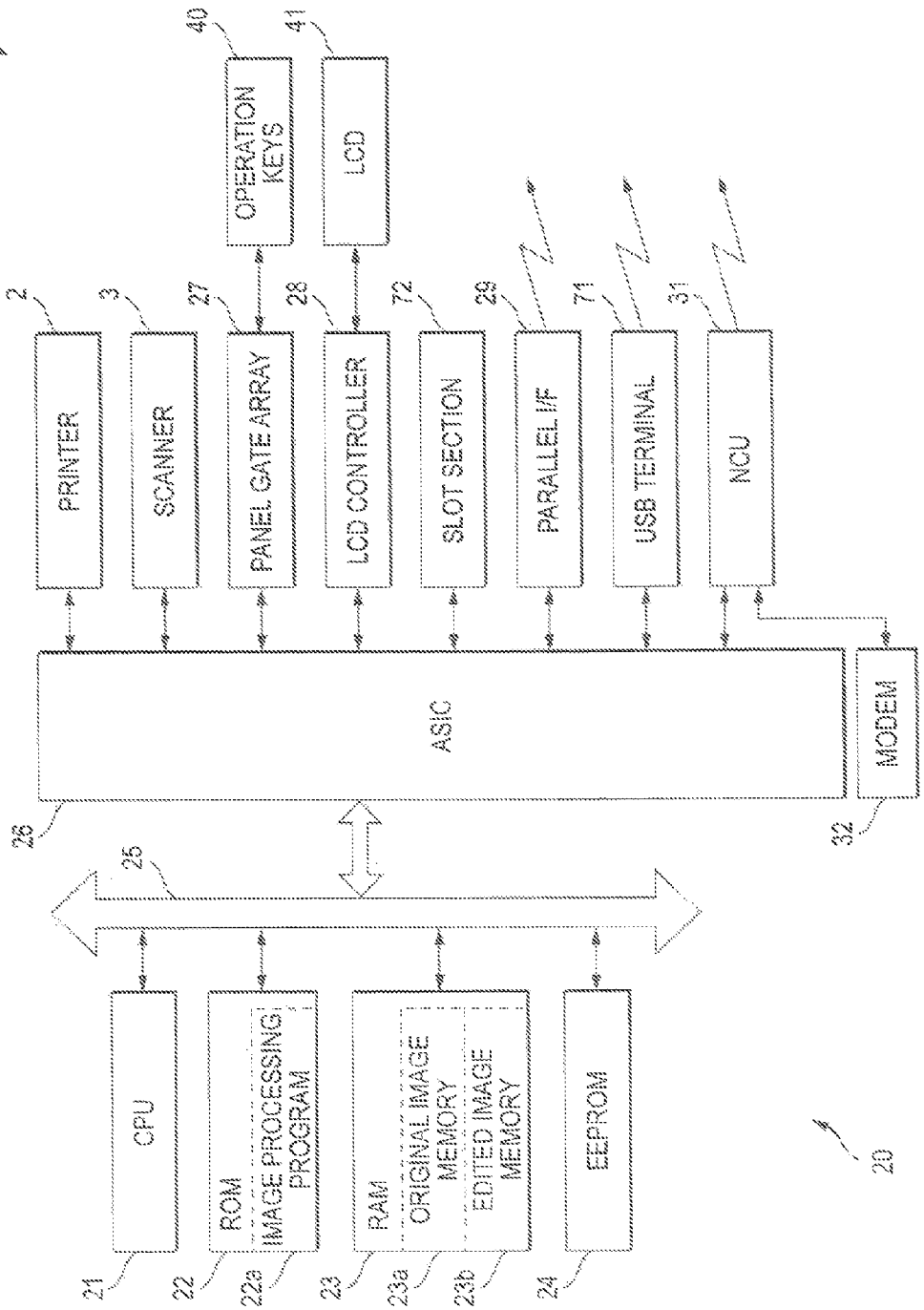
FIG. 2 is a block diagram showing an electrical configuration of the multifunction peripheral device.

Next, a general electrical configuration of the MFP 1 will be described with reference to FIG. 2. FIG. 2 is a block diagram showing the electrical configuration of the MFP 1. The controller 20 controls overall the operations of the MFP 1 including the printer 2, the scanner 3, and the operation panel 4. The controller 20 is structured as a microcomputer mainly including, as shown in FIG. 2, a Central Processing Unit (CPU) 21, a Read Only Memory (ROM) 22, a Random Access Memory (RAM) 23, and an Electrically Erasable and Programmable Memory (EEPROM) 24, and is connected to an Application Specific Integrated Circuit (ASIC) 26 via a bus 25.

In the ROM 22, various control programs are stored for controlling the facsimile function, the copying function, the scanner function, and the trimming function, etc., respectively, and constants and tables to be used in the control programs are stored. When an image is displayed on the display screen 41, it is displayed based on a display configuration showing a display form, a magnification and a display position of the image on the display screen 41, and a plurality of display configurations are stored in the ROM 22. The display configurations will be described later.

The RAM 23 is a memory which can be accessed randomly, and temporally stores variables and parameters when the CPU 21 executes various functions. This RAM 23 includes, for example, an original image memory 23a for storing original image data for image editing and an edited image memory 23b for storing image data edited by executing an edit program.

An image processing program to be stored in the ROM 22 is programmed so that image data (original image data) to be edited is stored in the original image memory 23a of the RAM 23 according to a user's operation on the operation keys 40, a part or the whole of the original image data is extracted, the extracted part is displayed on the display screen 41, and further a range is designated in the displayed original image according to a user's operation on the operation keys 40 and image data in the range is stored in the edited image memory 23b of the RAM 23.

The ASIC 26 controls the operations of the printer 2, the scanner 3, the operation panel 4, and the slot section 72 according to an instruction from the CPU 21. In the printer 2, the scanner 3, and the slot section 72, operations of a motor for driving the printer 2, an ink jet recording head, a motor for driving the scanner 3, and the image scanning unit, etc., are controlled by the controller 20 although detailed description of these are omitted.

To the ASIC 26, a panel gate array 27 which controls the operation keys 40 for inputting a desired instruction into the MFP 1 is connected. The panel gate array 27 detects pressure of the operation keys 40 and outputs a predetermined code signal (key codes). The key codes are assigned to the plurality of operation keys 40. When the CPU 21 receives a predetermined key code from the panel gate array 27, the CPU 21 performs control processing that should be executed according to a predetermined key processing table. The key processing table indicates association between the key codes and control processings, and is stored in, for example, the ROM 22.

To the ASIC 26, an LCD controller 28 for controlling the screen display on the liquid crystal display 41 is connected. The LCD controller 28 displays information on the operation of the printer 2 or the scanner 3 and a read image or inputted image on the liquid crystal display 41 based on an instruction from the CPU 21.

The CPU 21 stores information showing a data to be displayed on the liquid crystal display 41 in display memories (not shown). The display memories are for color information of RGB three primary colors, respectively.

The liquid crystal display 41 has matrix switches that are not shown, for the RGB three primary colors, respectively. By applying a charge to the matrix switch, liquid crystal molecules immediately under the matrix switch are aligned in a light transmitting direction, so that any of the RGB colors is displayed on the liquid crystal display 41. Each matrix switch corresponds to one dot of a respective RGB color.

One bit of the display memory corresponds to one matrix switch. Namely, one bit of the display memory corresponds to one dot of any of the RGB colors.

The LCD controller 28 operates the values of RGB stored in the display memories (not shown) at a constant frequency and reads them. Then, a voltage is applied to a matrix switch corresponding to a bit of "1". Therefore, the liquid crystal display 41 displays information created by the CPU 21.

To the ASIC 26, a parallel interface 29 and a USB terminal 71 are connected for data exchange with the computer via a parallel cable or a USB cable. Furthermore, to the ASIC 26, a Network Control Unit (NCU) 31 and a modem 32 for realizing the facsimile function are connected.

In the slot section 72, a plurality of card slots into which card type memories can be loaded are provided. When a card type memory is loaded in the card slot and image data is read by the controller 20 described later from the loaded card type memory, the readout image data and information on the image data are displayed on the liquid crystal display 41 by the controller 20. Alternatively, a selected arbitrary image is formed on a recording sheet by the printer 2.

Next, a display configuration to be displayed on the display screen 41 in the trimming processing will be described with reference to FIGS. 3A to 3F. FIGS. 3A to 3F show display configurations to be displayed on the display screen of the liquid crystal display 41. By properly operating the operation keys, any of the display configurations shown in FIGS. 3A to 3F can be set.

Figure 3:
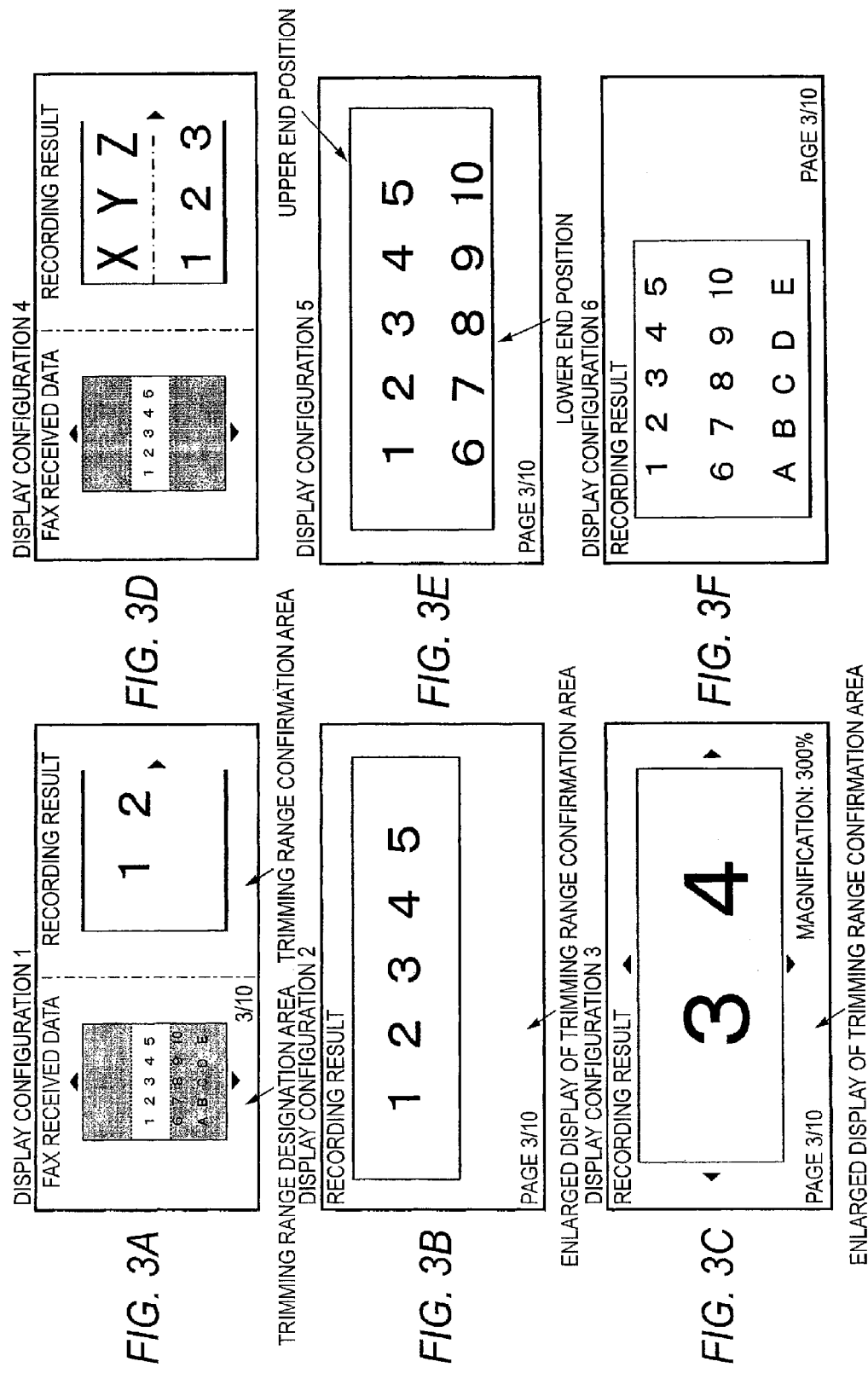
FIGS. 3A to 3F are image screen views showing a plurality of display configurations.

FIG. 3A shows a display configuration 1, wherein the rectangular (oblong) display screen 41 is divided into two areas by a dividing line (alternate long and short dashed line) that divides a longer side in two, and one page of the image is displayed first in the trimming range designation area on the left side. The first aspect describes an example in which only a desired portion of the data received by facsimile is printed. In the example shown in FIG. 3A, image data of 10 pages is received by facsimile (stored in the original image memory 23*a* of the RAM 23 as image data to be edited), and as a predetermined amount thereof, image data is extracted on a page by page basis (image data of the third page is extracted in FIG. 3A) and displayed in the trimming range designation area. In the same drawing, the third page is displayed in the trimming range designation area, and in this third page, "1 2 3 4 5, 6 7 8 . . ." is written horizontally. On the lower right part of the trimming range designation area, "3/10" is displayed which indicates that the third page of ten pages is displayed in this trimming range designation area. When the longitudinal width of the display screen 41 is longer than the lateral width thereof, the display screen 41 is divided into two areas by dividing a longer side in two. That is, the display screen 41 is divided into an upper side and a lower side.

On the page displayed in this trimming range designation area, a user can arbitrarily set an upper end and a lower end of a trimming range to be trimmed by operating the operation keys. In this drawing, the dashed line above the indication of "1 2 3 4 5" is set as the upper end, and the dashed line below the indication is set as the lower end. When the trimming range is designated, the designated area and an area that is not designated are made differently in display form from each other so that the trimming range can be easily recognized. For example, it is allowed that the background of the designated range is shown in white and the portion excluding the designated range is shown as a background in gray or shaded so that they are distinguished from each other.

When an upper end and a lower end are set, an image in the range is enlarged larger than the display state in the trimming range designation area and displayed in a trimming range confirmation area on the right side. Hereinafter, an image to be displayed in the trimming range designation area will be referred to as an extracted image (first image) and a trimmed image displayed in the trimming range confirmation area will be referred to as a selected image (second image).

FIG. 3B shows a display configuration 2 in a case where only a selected image is displayed on the display screen. In the display configuration 1 shown in FIG. 3A, a selected image is displayed on one side of the divided display screen, so that only a part of the enlarged image may be displayed, however, in this display configuration 2 of FIG. 3B, the selected image is displayed on the entire display screen, so that the selected image can be more sufficiently confirmed.

FIG. 3C shows a display configuration 3 in a case where the display magnification is changed in the state of the display configuration 2, that is, in a state that only the selected image is displayed on the display screen, and the image is re-displayed. The display magnification is set by operating the operation keys of the numeric keypad 40*d*, etc., and the value of the set display magnification is indicated on the lower right of the display screen 41. In FIG. 3C, 300% is indicated. Thus, in the case of an enlarged display, the whole of the selected image cannot be displayed on the display screen 41, however, lateral and longitudinal scrolling can be performed by operating the cross key 40*a*.

FIG. 3D shows a display configuration 4 in a state that, when a selected image is formed by trimming, if a trimmed selected image has already been present, the current selected image is displayed successively to the previously formed selected image. As shown in the trimming range confirmation area, "XYZ . . ." is designated by the previous trimming, and "123 . . ." is designated as a trimming range by the current trimming and displayed successively to the previously designate drange. In the edited image memory 23*b*, data of a selected image whose trimming range was determined is stored, however, when a selected image was previously stored, the current data is stored successively to the previous image data. Therefore, in the edited image memory 23*b*, selected image data designated by a plurality of times of trimming are successively stored, and printing can be performed based on image data stored in the edited image memory 23*b*.

Therefore, a plurality of necessary portions can be extracted from received facsimile data and collectively printed, and this saves recording sheets and the time necessary for printing.

FIG. 3E shows a display configuration 5 indicating that the upper end and the lower end are changeable in the state that only the selected image is displayed on the display screen. In the case of the display as shown in FIG. 3B, when a lower end is designated by the operation keys 40 and the position of the lower end is changed to a lower side to widen the trimming range, "678 . . . " continued below "123 . . . " is included in the trimming range and displayed.

FIG. 3F shows a display configuration 6, showing an example in which when the longitudinal length of the selected image designated by trimming range designation is long, an enlargement magnification of the selected image is set so as to match with the longitudinal width of the display screen, and the image is displayed. When a range is designated in the trimming range designation area, the range is enlarged at a predetermined magnification and displayed in the trimming range confirmation area, and in this case, the display magnification is set so that the longitudinal length of the selected image falls within the longitudinal length of the display screen 41.

Figure 4:
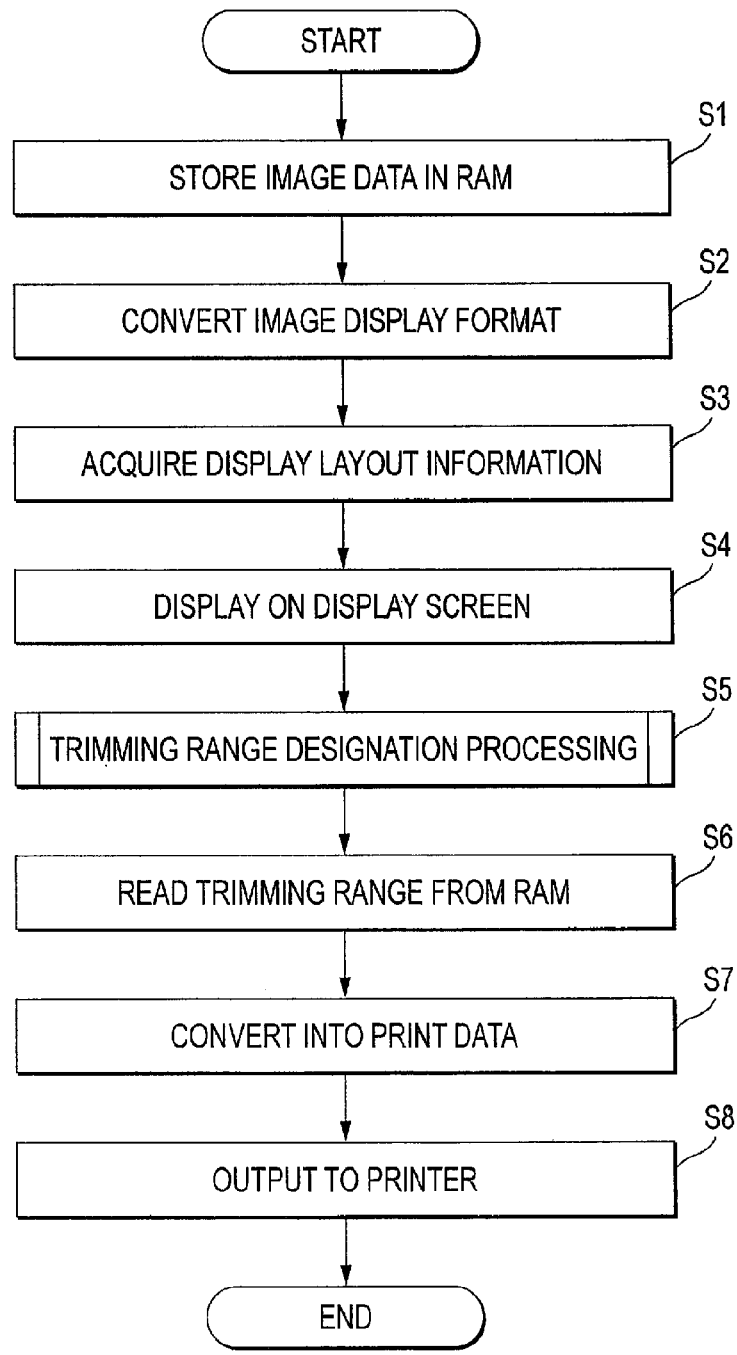
FIG. 4 is a flowchart showing main processing.

Next, with reference to the flowcharts shown in FIG. 4 through FIG. 8, image processing to be executed by the CPU 21 will be described. Image processing herein includes selecting image data in a range designated by a user and performing outputting such as printing. FIG. 4 is a flowchart showing main processing as an outline of this image processing. First, a user designates image data (original image data) to be edited. It can be selected from image data received by facsimile or image data stored in a card type memory loaded in the slot section 72.

The CPU 21 stores the selected image data in the original image memory 23a of the RAM 23 (S1). When editing image data received by facsimile, the image data is transferred from an EEPROM 24 for storing image data to the RAM 23, and when the image data is stored in a card type memory loaded in the slot section 72, the image data is transferred from the slot section 72 to the RAM 23.

Next, these image data are different in storing format, so that they are converted into a format capable of being displayed on the display screen 41 (S2). Next, display layout information (display configuration) is acquired (S3). This display layout information is for displaying an original image in the trimming range designation area shown in FIG. 3A, and shows a display position and a reduction ratio of an extracted image, and is stored in a predetermined area of the ROM 22.

Next, based on the display layout information, information for displaying the extracted image in the trimming range designation area of the display screen 41 is formed, and the information is transmitted to the LCD controller 28. The LCD controller 28 receives this information and displays the image on the display screen 41 based on the information (S4). In the example of FIG. 3A, image data stored in the original image memory 23a consists of image data of 10 pages, so that an image data is extracted for each page of the image data, and display information of one page is formed at S4 and displayed on the display screen 41 as an extracted image by the LCD controller. Therefore, when a page change is instructed, based on this instruction, image data of another one page is extracted and switch-displayed on the display screen 41 by the LCD controller 28.

Next, trimming range designation processing is performed (S5). This trimming range designation processing is processing to be performed for a user to select an arbitrary range from the extracted image, and details of this will be described later with reference to FIG. 5 and FIG. 6.

Next, regarding the trimming range designation processing, image data (selected image data) selected by the trimming range designation processing is stored in the edited image memory 23b of the RAM 23. Then, image data is read-out from the edited image memory 23b (S6), converted into print data (S7), and outputted to the printer 2. In the conversion of the print data, when the data is RGB color images, it is converted into CMYK, and subjected to halftone processing which converts the image into data to be outputted on a printing dot basis. The printer 2 inputs this print data and performs printing on predetermined recording sheets.

Figure 5:
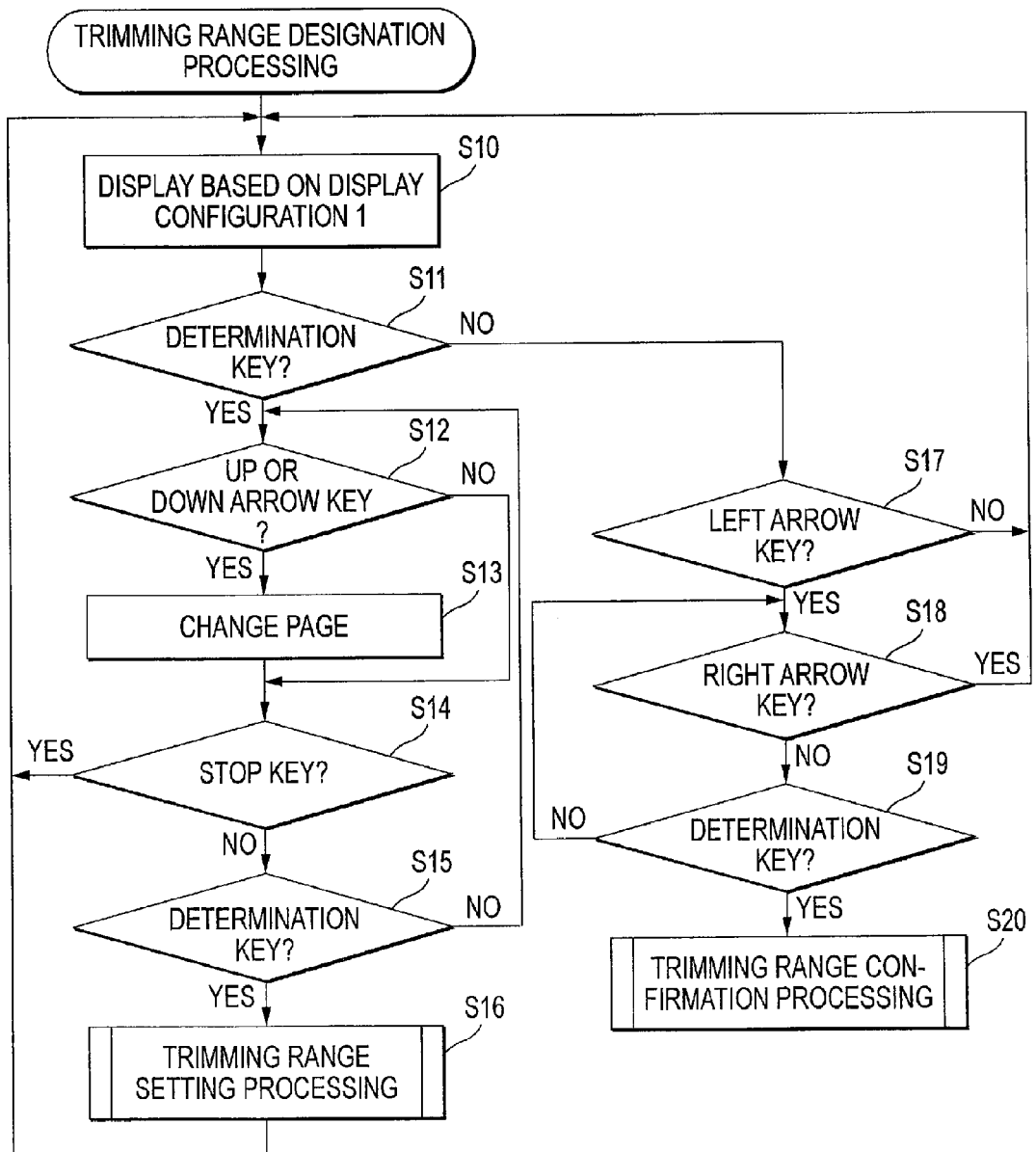
FIG. 5 is a flowchart showing trimming range designation processing.

Next, with reference to FIG. 5, the trimming range designation processing will be described. FIG. 5 is a flowchart showing the trimming range designation processing. In this trimming range designation processing, a user designates a range or instructs to change the display configuration by operating the cross key 40a, the determination key 40b, and the stop key 40c, and the CPU 21 detects this operation and performs processing such as changing of the indication on the display screen 41 according to the operation.

In the trimming range designation processing, first, displaying is performed based on the display configuration 1 (S10). In the initial state that a trimming range is not designated, the first page (image corresponding to an extracted image data) of image data in the original image memory 23a is displayed in the trimming range designation area on the left side of the display configuration 1, and the trimming range confirmation area on the right side displays nothing and is blank.

Next, it is determined whether the determination key 40b has been operated (S11). In the case where the determination key 40b has been operated (S11: Yes), the process turns into a state for setting a trimming page, and it is determined whether the up or down arrow key for designating up or down among four way switches of the cross key 40a has been operated (S12). In the case where the up or down arrow key has been operated (S12: Yes), the page is changed according to the operation on the up or down arrow key and the designated page is displayed in the trimming range designation area (S13). When "up" is designated by the cross key 40a, the page is returned, and when "down" is designated, the next page is displayed. In the example shown in FIG. 3A, the third page of the ten pages is displayed by this operation.

When the up and down arrow keys are not operated, or when the page is changed, it is determined whether the stop key 40c has been operated (S14). In the case where the stop key 40c has been operated, the process returns to S10, and when the stop key 40c is not operated (S14: No), it is determined whether the determination key 40b has been operated (S15). In the case where the determination key 40b has been operated (S15: Yes), trimming range setting processing is performed (S16). When the determination key 40b is not operated (S15: No), the process returns to S12. The trimming range setting processing will be described later with reference to FIG. 6.

On the other hand, in the determination of S11, when the determination key 40b is not operated (S11: No), it is determined whether the left arrow key of the cross key 40a has been operated (S17). In the case where the left arrow key has been operated (S17: Yes), it is determined next whether the right arrow key has been operated (S18), and in the case where the right arrow key has been operated (S18: Yes), the process returns to S10, and when the right arrow key is not operated (S18: No), it is next determined whether the determination key 40b has been operated (S19).

In a case where the determination key 40b has been operated (S19: Yes), the trimming range confirmation processing is performed (S20). When the determination key 40b is not operated (S19: No), the process returns to S18. The trimming range confirmation processing will be described later with reference to FIG. 7.

Figure 6:
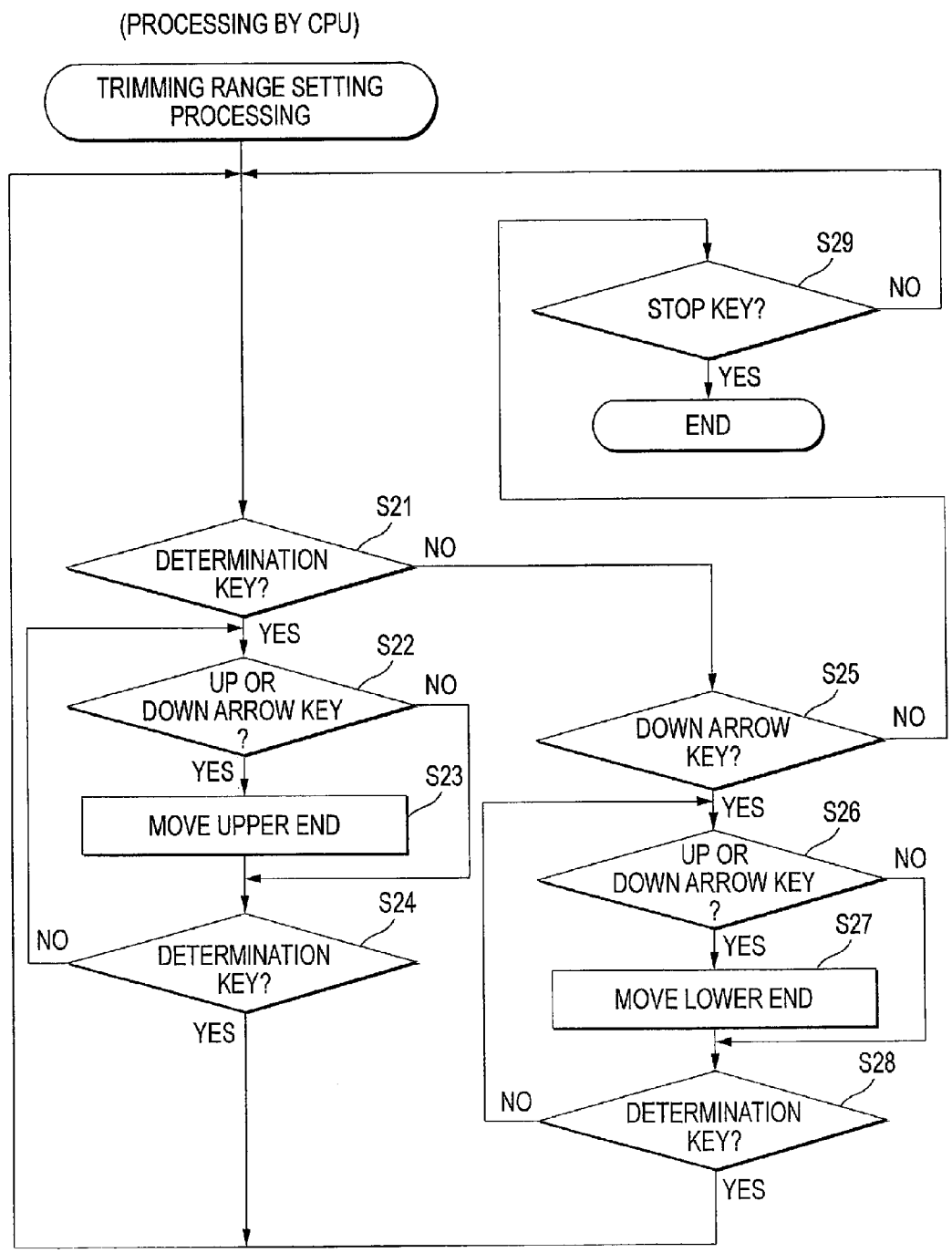
FIG. 6 is a flowchart showing trimming range setting processing.

Next, the trimming range setting processing of S16 will be described with reference to FIG. 6. FIG. 6 is a flowchart showing the trimming range setting processing. This processing is for designating a trimming range in the extracted image displayed in the trimming range designation area by operating the operation keys 40 by a user and determining the trimming range by the CPU 21 by detecting the operation.

First, it is determined whether the determination key 40b has been operated (S21). In the case where the determination key 40b has been operated (S21: Yes), the process turns into a state for setting an upper end of the trimming range, and determines whether the up or down arrow key has been operated (S22). In the initial state, the upper end of the trimming range is set to the upper end of a page being displayed, and can be moved downward or upward by operating the up or down arrow key (S23). According to movement of the upper end, the horizontal dashed line showing the upper end moves up or down on the display. When the up or down arrow key is not operated (S22: No) or when the upper end was moved, it is determined next whether the determination key 40b has been operated (S24).

In a case where the determination key 40b has been operated (S24: Yes), it is regarded that the setting of the upper end has been finished, and the process returns to S21. When the determination key 40b is not operated (S24: No), the process returns to S22.

In the determination of S21, when the determination key 40b is not operated (S21: No), it is determined next whether the down arrow key of the cross key 40a has been operated (S25). In a case where the down arrow key has been operated (S25: Yes), the process turns into a state for setting a lower end of the trimming range, and next, it is determined whether the upper or down arrow key has been operated (S26).

In the initial state, the lower end of the trimming range is set on the lower end of a page being displayed, and by operating the up or down arrow key, the lower end can be moved upward or downward (S27). According to the movement of the lower end, the horizontal dashed line showing the lower end is moved upward or downward on the display. When the up or down arrow key is not operated (S26: No) or when the lower end was moved, next, it is determined whether the determination key 40b has been operated (S28).

In a case where the determination key 40b has been operated (S28: Yes), it is regarded that the setting of the lower end has been finished and the process returns to S21, and when the determination key 40b is not operated (S28: No), the process returns to S26.

In the determination of S25, when the down arrow key is not operated (S25: No), it is next determined whether the stop key 40c has been operated, and when the stop key 40c is not operated (S29: No), the process returns to S21. In a case where the stop key 40c has been operated (S29: Yes), this trimming range setting processing ends. Therefore, as shown in the flowchart of FIG. 5, the process returns to S10.

Therefore, in this trimming range setting processing, an upper end and a lower end of the trimming range can be set. When only an upper end is set, the lower end is set to the lower end of the page being extracted, and when only a lower end is set, the upper end is set to the upper end of the page being extracted.

When the upper end and the lower end are set and the process returns to S10, the set range, that is, the section sandwiched between the upper end and the lower end, is selected as selected image data, enlarged at a predetermined display magnification, and displayed in the trimming range confirmation area.

Figure 7:
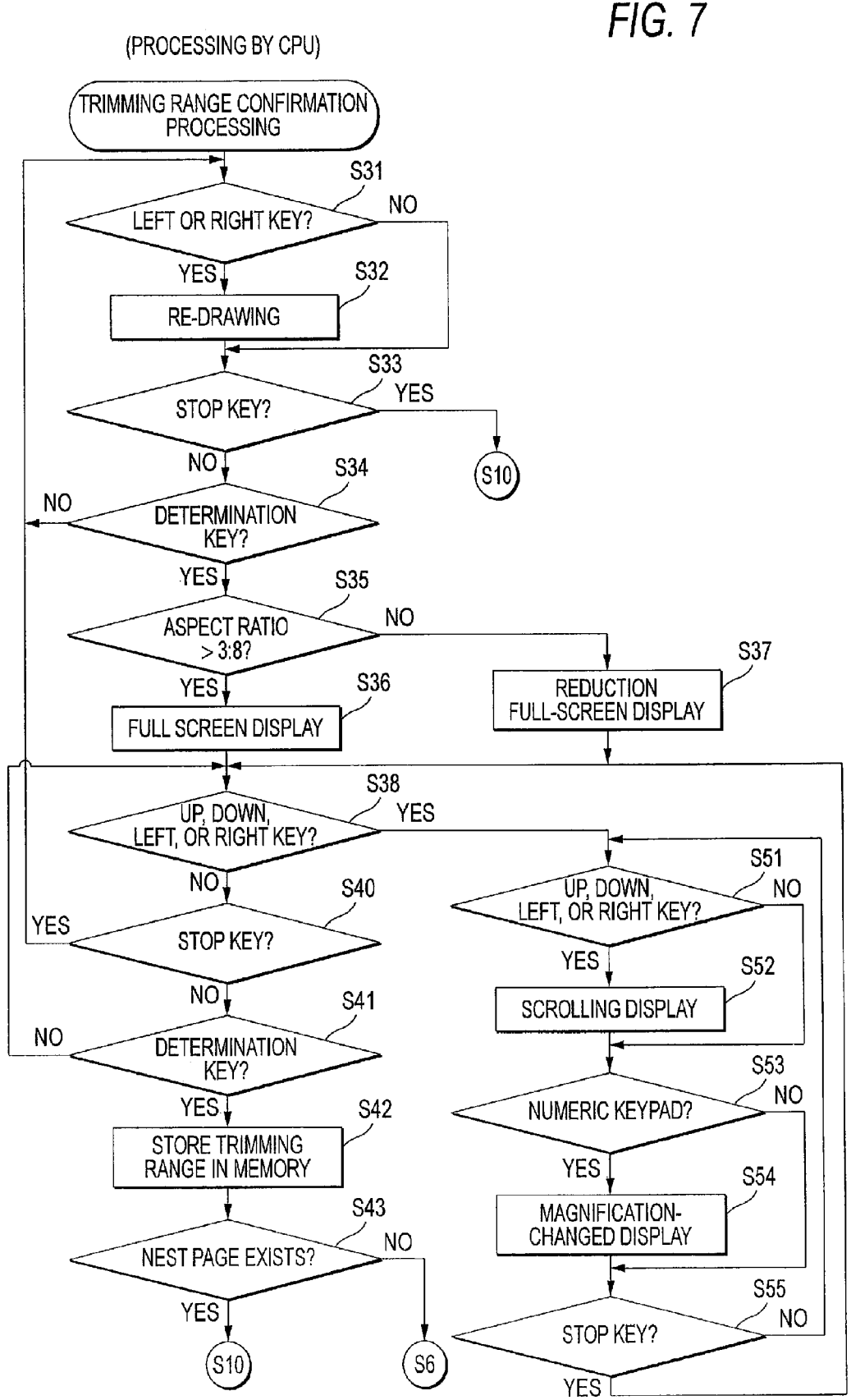
FIG. 7 is a flowchart showing trimming range confirmation processing.

Next, with reference to FIG. 7, trimming range confirmation processing of S20 of the flowchart of FIG. 5 will be described. FIG. 7 is a flowchart showing the trimming range confirmation processing. In this trimming range confirmation processing, confirmation of a designated selected image by means of full-screen display is performed in the trimming range designation processing.

First, it is determined whether the left or right key of the cross key 40a has been operated (S31). In a case where the left or right key has been operated (S31: Yes), re-drawing on the display screen 41 is performed (S32). The display magnification, the upper end, and the lower end are reset as described later, and re-drawing according to the reset state is performed.

When the left and right keys are not operated (S31: No), or when the processing of S32 has ended, it is determined next whether the stop key 40c has been operated (S33). In a case where the stop key 40c has been operated (S32: Yes), the process returns from this trimming range confirmation processing to S10 that is the beginning of the trimming range designation processing. When the stop key 40c is not operated (S32: No), it is determined whether the determination key 40b has been operated (S34).

When the determination key 40b is not operated (S34: No), the process returns to S31. In a case where the determination key 40b has been operated (S34: Yes), it is determined whether the aspect ratio of the image selected by the trimming range designation processing is smaller than or equal to 3:8. When the aspect ratio is smaller than or equal to 3:8, the aspect ratio of the display screen 41 is 3:8, so that the lateral width of the selected image is enlarged so as to match with the lateral width of the display screen 41, and full-screen display shown in the display configuration 2 (see FIG. 3B) is performed (S36).

On the other hand, when the aspect ratio of the selected image is larger than 3:8, if the lateral width of the selected image is matched with the lateral width of the display screen 41, the longitudinal width of the selected image becomes larger than the longitudinal width of the display screen 41 and the entirety of the selected image cannot be displayed on the display screen 41. Therefore, in this case, the selected image is enlarged so that the longitudinal width thereof matches with the longitudinal width of the display screen 41 (referred to as reduction full-screen display since it is reduced more than the image displayed at S36), and displayed as shown in the display configuration 6 (see FIG. 3F) (S37).

Full-screen display is performed by the processing of S36 or S37, and next, it is determined whether any of the up, down, left, and right keys of the cross key 40a has been operated (S38). When any of the up, down, left, and right keys is not operated (S38: No), it is determined whether the stop key 40c has been operated (S40). In a case where the stop key 40c has been operated (S40: Yes), the process returns to S31. When the stop key 40c is not operated (S40: No), it is determined whether the determination key 40b has been operated (S41).

When the determination key 40b is not operated (S41: No), the process returns to S38. In a case where the determination key 40b has been operated (S41: Yes), image data (selected image data) in the currently set trimming range is stored in the edited image memory 23b (S42). In a case where the edited image memory 23b has already stored selected image that was previously designated, successively to this selected image data, the currently designated selected image data is stored.

Next, it is determined whether a next page exists, and when a next page exists (S43: Yes), the process returns to S10. When a next page does not exist (S43: No), the trimming range confirmation processing ends and the process advances to S6 (see FIG. 4).

On the other hand, in the determination of S38, in the case where any of up, down, left, and right keys has been operated (S38: Yes), on the full-screen display, the selected image screen can be scrolled or its display magnification can be changed. Then, it is determined whether any of the up, down, left, and right keys has been operated (S51). In the case where any of the up, down, left, and right keys has been operated (S51: Yes), the portion that is not displayed in the selected image is displayed by scrolling according to a key operation (S52).

When any of the up, down, left, and right keys is not operated (S51: No) or when the processing of S52 has ended, it is determined whether a display magnification has been set through the numeric keypad 40d (S54). In a case where the display magnification has been set (S54: Yes), the display magnification is changed and re-indication shown in the display configuration 3 is performed (S54). When a display magnification is not set (S54: No) or when the processing of S54 has ended, it is determined whether the stop key 40c has been operated (S55). In a case where the stop key 40c has been operated (S55: Yes), the process returns to S38, and when the stop key 40c is not operated (S55: No), the process returns to S38.

As described above about the first aspect, an extracted image corresponding to extracted image data extracted from the original image memory 23a is displayed in the trimming range designation area on the left side of the display screen 41, and a user designates an arbitrary trimming range from the extracted image. A selected image based on image data in the designated trimming range is enlarged and displayed in the trimming range confirmation area on the right side of the display screen 41. The selected image displayed in the trimming range confirmation area can be enlarged or scrolled according to a user's instruction. Therefore, in an image processing apparatus such as a facsimile machine, trimming can be performed by easy operations, and the consumption of recording sheets to be used for outputting such as printing and the time necessary for printing can be reduced.

Second Aspect

Figure 8:
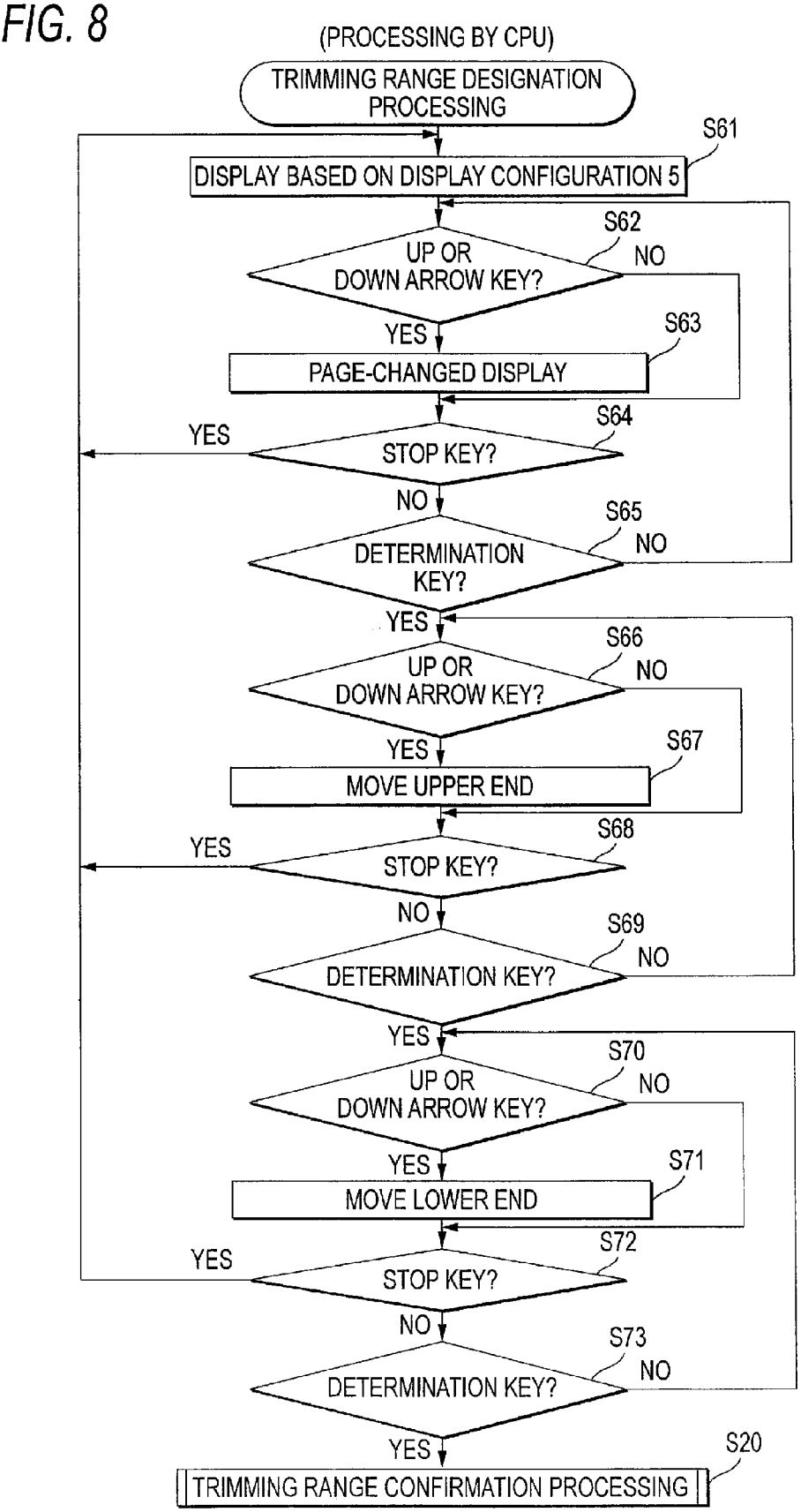
FIG. 8 is a flowchart showing trimming range designation processing in a second aspect of the present invention.

Next, with reference to FIG. 8, a second aspect will be described. FIG. 8 shows a variation of the trimming range designation processing of the first aspect. When a trimming range is designated, a selected image based on image data in the trimming range is displayed on the full screen of the display screen 41. The same components as in the first aspect are assigned to the same reference numerals and description thereof is omitted.

In the trimming range designation processing in the second aspect, first, the display configuration 5 (FIG. 3E) is acquired, and an image is displayed on the display screen 41 (S61). In the initial state that image data to be edited is selected, a first page is extracted, the upper end of the first page is set as the upper end of a trimming range, and the lower end of the first page is set as the lower end of the trimming range, and displaying is performed without dividing the display screen 41. In this case, displaying is performed so that the upper end of the trimming range matches with the upper end of the display screen 41, and the lower end of the trimming range matches with the lower end of the display screen 41.

Next, it is determined whether the up or down arrow key of the cross key 40a has been operated (S62). In a case where the up or down arrow key has been operated (S62: Yes), the page is changed and displayed (S63). As in the case of the first aspect, when the up arrow key is operated, the page is returned, and when the down arrow key is operated, the page goes to a next page, and in the changed page, the upper end of the changed page is set as the upper end of a trimming range, and the lower end of the page is set as the lower end of the trimming range.

When the up or down arrow key is not operated (S62: No) or when the processing of S63 has ended, it is next determined whether the stop key 40c has been operated (S64). In a case where the stop key 40c has been operated (S64: Yes), the process returns to S61, and when the stop key 40c is not operated, it is next determined whether the determination key 40b has been operated (S65). When the determination key 40b is not operated (S65: No), the process returns to S62. In a case where the determination key 40b has been operated (S65: Yes), it is regarded that the page is determined and the process transfers to processing for designating a trimming range, and then, processing for designating an upper end of the trimming range is performed first.

It is determined whether the up or down arrow key has been operated (S66), and in a case where the up or down arrow key has been operated (S66: Yes), the upper end of the trimming range is changed and the range from the upper end to the lower end is displayed on the display screen (S67). When the up and down arrow keys are not operated (S66: No) or when the processing of S67 has ended, it is next determined whether the stop key 40c has been operated (S68). In the case where the stop key 40c has been operated (S68: Yes), the process returns to S61. When the stop key 40c is not operated (S68: No), it is determined whether the determination key 40b has been operated (S69). When the determination key 40b is not operated (S69: No), the process returns to Step S66. In a case where the determination key 40b has been operated (S69: Yes), it is regarded that the upper end of the trimming range was determined and the process transfers to processing for designating a lower end.

In the processing for designating a lower end, first, it is determined whether the up or down arrow key has been operated (S70), and in a case where the up or down arrow key has been operated (S70: Yes), the lower end of the trimming range is changed and the range from the upper end to the lower end is displayed on the display screen 41 (S71). When the up and down arrow keys are not operated (S70: No) or when the processing of S71 has ended, it is next determined whether the stop key 40c has been operated (S72). In a case where the stop key 40c has been operated (S72: Yes), the process returns to S61. When the stop key 40c is not operated (S72: No), it is determined whether the determination key 40b has been operated (S73). When the determination key 40b is not operated (S73: No), the process returns to S70. In a case where the determination key 40b has been operated (S73: Yes), it is regarded that a lower end of the trimming range is determined, and the process advances to trimming range confirmation processing (S20). This trimming range confirmation processing is the same as in the first aspect shown in FIG. 7, so that description thereof is omitted herein.

As described above about the second aspect, without dividing the display screen 41, a trimming range is designated, and when an upper end is determined first, a lower end is determined next. As in the first aspect, in the initial state, the upper end and lower end of the page are set as the upper end and lower end of a trimming range, so that by operating the determination key 40b twice after changing the upper end, the lower end is set to the lower end of the page, and the process can transfer to the trimming range confirmation processing. The same applies to the lower end of the trimming range.

The extracting step corresponds to the processings of S10 and S13 of the flowchart of FIG. 5, the range designating step corresponds to the processing of S16 of the flowchart of FIG. 5, the enlarged image displaying step corresponds to the processings of S36 and S37 of the flowchart of FIG. 7, the mode switching step corresponds to the processing of S34 of the flowchart of FIG. 7, and the scrolling step corresponds to the processing of S52 of FIG. 7.

The present invention was described above based on the exemplary aspects, however, the present invention is not limited to the above-described aspects at all, and it is easily supposed that the present invention can be variously altered and varied without deviating from the spirit of the invention.

For example, in aspects described above, processings in a multifunction peripheral device are described, however, the processings may be of a single-function device such as a printer or a facsimile machine.

In aspects described above, data received by facsimile is subjected to trimming, however, trimming may also be applied to data inputted from a computer or the like.

In the first aspect, in the trimming range confirmation processing, a selected image is displayed on the full screen, and further enlarged, and scrolled, however, in this full-screen display, the upper end and the lower end of the trimming range may be changed.

In aspects described above, a trimmed edited image is outputted by being printed by the printer 2, however, it is also allowed that the trimmed edited image is outputted to a computer or transmitted by facsimile.

In aspects described above, an image corresponding to a page is displayed on the trimming range designation area, however, next or previous pages may be displayed successively. In addition, the trimming range between the set upper end and the lower end may be over more than one page.

In aspects described above, an image in the trimming range is enlarged and displayed in the trimming range confirmation area, however, the image in the trimming range may be reduced or rotated. The color tone or brightness of the image in the trimming range may be changed.

In aspects describe above, when an upper end and a lower end of a desired range in an extracted image displayed on the display screen 41 is designated by operating operation keys 40, a range between the designated upper end and lower end is displayed in an enlarged manner as a selected image.

Therefore, even when a special device for designating a position on a screen, such as a mouse, is not provided, a part of the displayed image can be easily selected by a simple configuration. Furthermore, the selected image is displayed while enlarged to be larger than the extracted image, so that even when the extracted image is displayed in a reduced manner, the selected range can be easily confirmed.

Particularly, for many images based on image data received by facsimile, it is sufficient that a range is designated by determining an upper end and a lower end of an image to be selected, and it is not necessary to designate the lateral range. By thus specifying a range, only a necessary portion in a received image can be printed, the time for printing can be shortened, and consumption of materials necessary for printing such as inks can be reduced.

In aspects describe above, the display screen is rectangular and displays an extracted image in one of a plurality of areas obtained by dividing a longer side of the display screen, and the enlarged image display part displays a selected image in another area of the plurality of areas, so that it is possible that a rectangular display screen is disposed in a long and narrow space such as a front face of an image processing apparatus such as a facsimile machine, the display screen is effectively divided, whereby an extracted image and a selected image can be displayed.

Therefore, it becomes unnecessary to increase the size of the entire image processing apparatus, and the image selecting operation can be easily performed.

In the aspects describe above, the image processing apparatus switches between a divided display mode for displaying an extracted image by the extracted image display unit and displaying a selected image by the enlarged image display part on the display screen and an enlarged display mode for displaying only a selected image by the enlarged image display part, so that even when the display screen is small and it is difficult to visually confirm the display screen when it is divided, a selected image can be displayed on the entire display screen and securely visually confirmed by switching into the enlarged display mode.

In aspects describe above, a selected image based on selected image data which is in the designated range is enlarged so that one side width of the selected image matches with one side width of an area to be displayed on the display screen, so that it becomes unnecessary for a user to adjust the magnification for matching with a display width of the display area, the image processing apparatus is conveniently used, and enlarged display matched with the size of the display screen is performed, and a selected image can be easily visually confirmed.

In aspects describe above, when enlarging and displaying a selected image based on selected image data which is in the designated range so that one side width of the selected image matches with one side width of a display area to be displayed on the display screen, if the other width of the selected image is larger than the other width of the display area, the other width of the selected image is enlarged so as to match it with the other width of the display area and displays the selected image, so that the entirety of the selected image can be displayed in the display area.

In aspects describe above, the selected image is scrolled when a part of a selected image displayed in an enlarged manner by the enlarged image display part is not displayed, so that the part that is not displayed due to enlargement can be displayed by scrolling, and the selected image can be confirmed.

In aspects describe above, when an upper end of a range is designated in an extracted image displayed on the display screen, the lower end of the extracted image displayed on the display screen is set as the lower end of the range, so that the operation for designating an area is simplified.

In aspects describe above, when a lower end of a range is designated in an extracted image displayed on the display screen, the upper end of the extracted image displayed on the display screen is set as the upper end of the range, so that the operation for designating an area is simplified.

In aspects describe above, an upper end or lower end in a selected image displayed in an enlarged manner is reset, and a selected image corresponding to image data in a new range between the reset upper end or lower end is re-displayed, so that even if the extracted image is small, a range can be set again in the selected image displayed in an enlarged manner, so that the operation for accurately designating an area is simplified.

In aspects describe above, operation keys includes a cursor key (cross key 40*a*) for designating a position in the upper-lower direction of an extracted image and a determination key 40*b* for determining the position designated by the cursor key and the position designated by the cursor key as an upper end or lower end when the determination key is operated, and thereafter, when the position is changed by the cursor key and the determination key is operated, the position is set as the other end so that it becomes unnecessary to provide three keys including keys for designating an upper end and a lower end, respectively, and a key for determination, and it is sufficient that two keys including a key for designating an upper end and a lower end and a key for determination are provided. Therefore, the configuration becomes simple.

In aspects describe above, the operation keys 40 include a display magnification setting key (numeric keypad 40*d*) for setting a display magnification, and a selected image is enlarged at a display magnification set by the display magnification setting key, so that it becomes possible for a user to perform enlargement to an arbitrary size. Therefore, the selected image can be displayed in a size that a user can easily view.

In aspects describe above, in the case where a selected image corresponding to selected image data has already been displayed on the display screen, successively to the displayed selected image, a selected image corresponding to selected image data which is in the designated range is displayed next, so that when a plurality of ranges are designated, a plurality of selected images based on these ranges can be confirmed as one group of images.

In aspects describe above, the image processing apparatus includes an edited image storage unit which stores selected image data and the image data stored in the edited image storage unit is outputted to an output destination, and in the case where the edited image storage unit has already stored selected image data, it stores next selected image data successively to the previously stored selected image data, so that only image data of a necessary portion can be successively outputted to the output part. Therefore, in a case of printing on recording media, printing on a smaller amount of recording media is possible, and this is economical.

In aspects describe above, when an upper end and a lower end of a desired range are designated in an extracted image displayed on the display screen by operating the operation keys, image data in the range narrowed by the designated upper and lower ends is enlarged and displayed as a selected image.

Therefore, even when a special device such as a mouse for designating a position on a screen is not provided, a part of a displayed image can be easily selected by a simple configuration. Furthermore, the selected image is enlarged to be larger than the extracted image and displayed, so that even when the extracted image is displayed in a reduced manner, the selected range can be easily confirmed.

Particularly, for many images based on image data received by facsimile, it is sufficient that a range is designated by determining an upper end and a lower end of an image to be selected, so that it is unnecessary to designate a lateral range. By thus specifying a range, only a necessary portion of a received image is printed, and this reduces the time for printing and reduces the consumption of materials such as inks necessary for printing.

What is claimed is:

1. An image processing apparatus comprising:
   a key operation unit comprising a plurality of keys;
   a display screen having a rectangular shape, the display screen comprising an upper side end and a lower side end opposite to each other;
   a first storage unit that stores an image data; and
   a processor that performs a processing,
   wherein the processing performed by the processor comprises:
     displaying a first image corresponding to the image data on the display screen;
     setting one of an upper end and a lower end in the first image displayed on the display screen in response to a first key input from the key operation unit, and thereafter setting, without changing the one of the upper end and the lower end, the other of the upper end and the lower end in the first image displayed on the display screen in response to a second key input different from the first key input from the key operation unit;
     designating a range from the set upper end to the set lower end in the first image and having a corresponding left end and a corresponding right end in the first image without setting the left end and the right end;
     selecting image data corresponding to the designated range in the first image; and
     displaying a portion of the first image defined by the set upper end, the set lower end, the corresponding left end and the corresponding right end, as a second image on the display screen.

2. The image processing apparatus according to claim 1, wherein the first storage unit stores image data information comprising the image data, and
   wherein the processing performed by the processor further comprises extracting the image data from the image data information stored in the first storage unit.

3. The image processing apparatus according to claim 1, wherein the displaying the second image comprises enlarging and displaying the second image.

4. The image processing apparatus according to claim 3, wherein the second image is enlarged so that a width of the enlarged second image matches with a width of a display area of the display screen.

5. The image processing apparatus according to claim 4, wherein the second image is enlarged so that the second image is entirely displayed on the display area.

6. The image processing apparatus according to claim 4, wherein if a ratio of a width of the second image in a first direction with respect to a width of the second image in a second direction perpendicular to the first direction is smaller than a ratio of a width of the display area in the first direction with respect to a width of the display area in the second direction, the second image is enlarged so that the width of the second image in the second direction matches the width of the display area in the second direction.

7. The image processing apparatus according to claim 3, wherein the plurality of keys comprise a magnification setting key which sets a display magnification, and
   wherein the second image is enlarged at the display magnification set by the magnification setting key.

8. The image processing apparatus according to claim 1, wherein the display screen comprises a plurality of areas obtained by dividing a longer side of the display screen,
   wherein the first image is displayed in one of the plurality of areas, and
   wherein the second image is displayed in another one of the plurality of areas.

9. The image processing apparatus according to claim 1, wherein the processing performed by the processor further comprises selecting one of a first display mode in which the first image and the second image are displayed at the same time and a second display mode in which only the second image is displayed.

10. The image processing apparatus according to claim 1, wherein the processing performed by the processor further comprises scrolling the second image when the second image is at least in part larger than a display area of the display screen.

11. The image processing apparatus according to claim 1, wherein a lower side end of the first image displayed on the display screen is set as the lower end in the first image when the upper end in the first image is set without specifically designating the lower end in the first image.

12. The image processing apparatus according to claim 1, wherein an upper side end of the first image displayed on the display screen is set as the upper end in the first image when the lower end in the first image is set without specifically designating the upper end in the first image.

13. The image processing apparatus according to claim 1, wherein the processing performed by the processor further comprises setting an upper end and a lower end in the second image, and displaying a third image based on an image data corresponding to a range between the upper end and the lower end in the second image.

14. The image processing apparatus according to claim 1, wherein the plurality of keys comprises:
a cursor key which designates a position in an upper-lower direction in the first image; and
a determination key which determines a position designated by the cursor key,
wherein a first position designated by the cursor keys when the determination key is operated is set as one of the upper end and the lower end in the first image, and
wherein a second position, which is different from the first position and designated by the cursor key is set as the other one of the upper end and the lower end in the first image when the determination key is operated.

15. The image processing apparatus according to claim 1, wherein when a previous image previously selected from the image data is displayed on the display screen, the second image is displayed adjacent to the previous image.

16. The image processing apparatus according to claim 1, further comprising:
a second storage unit that stores the selected image data; and
an output unit that outputs the selected image data stored in the second storage unit to a predetermined output destination,
wherein when the second storage unit stores a previous data, the second storage unit stores the selected image data successive to the previous data.

17. A computer program product embodied on a non-transitory computer readable medium, which when executed by a computer, causes the computer to perform operations comprising:
displaying a first image corresponding to an image data stored in a storage unit on a display screen;
setting one of an upper end and a lower end in the first image displayed on the display screen in response to a first key input from a key operation unit, and thereafter setting, without changing the one of the upper end and the lower end, the other of the upper end and the lower end in the first image displayed on the display screen in response to a second key input different from the first key input from the key operation unit;
designating a range from the set upper end to the set lower end in the first image and having a corresponding left end and a corresponding right end in the first image without setting the left end and the right end;
selecting image data corresponding to the designated range in the first image; and
displaying a portion of the first image defined by the set upper end, the set lower end, the corresponding left end and the corresponding right end, as a second image on the display screen.

18. The computer program product according to claim 17, wherein the storage unit stores a plurality of image data comprising the image data, and
wherein the operations further comprises extracting the image data from the plurality of image data stored in the storage unit.

19. The computer program product according to claim 17, wherein the displaying the second image comprising enlarging and displaying the second image.

* * * * *